(12) United States Patent
Fujii

(10) Patent No.: US 7,711,323 B2
(45) Date of Patent: May 4, 2010

(54) WIRELESS COMMUNICATION APPARATUS AND RESPONSE DATA PROCESSING METHOD THEREFOR

(75) Inventor: Kunihide Fujii, Tokyo (JP)

(73) Assignee: Sony Corporation, Tokyo (JP)

(*) Notice: Subject to any disclaimer, the term of this patent is extended or adjusted under 35 U.S.C. 154(b) by 649 days.

(21) Appl. No.: 10/987,759

(22) Filed: Nov. 11, 2004

(65) Prior Publication Data

US 2005/0111420 A1 May 26, 2005

(30) Foreign Application Priority Data

Nov. 19, 2003 (JP) ............ P-2003-389191

(51) Int. Cl.
*H04B 5/00* (2006.01)

(52) U.S. Cl. ............ 455/41.1; 455/41.2; 455/410; 455/411; 370/338; 370/346; 370/470; 375/240.27; 708/250

(58) Field of Classification Search .......... 455/41.1, 455/41.2, 410, 411; 370/338, 346, 470; 379/92.01; 375/240.27; 235/451; 708/250
See application file for complete search history.

(56) References Cited

U.S. PATENT DOCUMENTS

| 5,307,351 | A | * | 4/1994 | Webster | 370/470 |
|---|---|---|---|---|---|
| 5,519,873 | A | * | 5/1996 | Butter et al. | 712/35 |
| 2002/0028657 | A1 | | 3/2002 | Davies | |
| 2002/0046226 | A1 | * | 4/2002 | Nakabe et al. | 708/250 |
| 2002/0140542 | A1 | * | 10/2002 | Prokoski et al. | 340/5.52 |
| 2002/0151275 | A1 | * | 10/2002 | Trost et al. | 455/41 |
| 2003/0114897 | A1 | | 6/2003 | Von Arx et al. | |
| 2003/0116626 | A1 | * | 6/2003 | Nakabe et al. | 235/451 |

FOREIGN PATENT DOCUMENTS

| EP | 1 321 889 | 6/2003 |
|---|---|---|
| JP | 2001-186214 | 7/2001 |
| JP | 2002345037 | 11/2002 |
| JP | 2003-006509 | 1/2003 |

(Continued)

OTHER PUBLICATIONS

"Introducing Bluetooth", Chapter 1, pp. 7-9 , Jan. 31, 2002, http://media.wiley.com/product_data/excerpt/75/07645488/0764548875.pdf.*

(Continued)

*Primary Examiner*—Charles N Appiah
*Assistant Examiner*—Randy Peaches
(74) *Attorney, Agent, or Firm*—K&L Gates LLP

(57) ABSTRACT

A wireless communication apparatus that communicates data with an external wireless apparatus in a wireless communication range includes a controller and a wireless communication interface device is provided. The wireless communication interface device includes a transmitting unit that transmits response request data to the external wireless apparatus, a counter that counts time for determining whether or not a time limit for waiting for the response data has elapsed, a storage unit that stores the response data, a receiving unit that receives first response data from the external wireless apparatus and that instantaneously receives second response data without an instruction from the controller when the time limit has not elapsed, a frame length checking unit that checks a frame length of the received response data, and an error detector that performs error detection on the response data.

26 Claims, 6 Drawing Sheets

FOREIGN PATENT DOCUMENTS

| | | |
|---|---|---|
| JP | 2003-167657 | 6/2003 |
| JP | 2004-502339 | 1/2004 |

OTHER PUBLICATIONS

International Search Report dated Jul. 18, 2007 (3 pgs.).
Japanese Office Action issued on Mar. 3, 2009, for corresponding Japanese Patent Application JP 2003-389191.
Bluetooth Specification Version 1.1, 2001.
Bluetooth Specification Version 1.1, Feb. 22, 2001.
Japanese Office Action issued on Oct. 13, 2009, for corresponding Japanese Patent Application JP 2003-389191.
Bluetooth specification Core part (1), Japan, Toshiba digital media network company, Apr. 2001, p. 2, 43, 44, 51, 62, 66, 72, 95, 270.
Bluetooth specification core part (2), Japan, Toshiba digital media network company, Apr. 2001, p. 543, 774, 801, 1023, 1041, 1044-1048.

\* cited by examiner

FIG. 7

| PREAMBLE (48 BITS MIN.) | SYNC (16 BITS) | LENGTH (8 BITS) | PAYLOAD | | | CRC CODE (16 BITS) |
|---|---|---|---|---|---|---|
| | | | 01 | NFCID2 | PAD | |

FIG. 8

| 7 | 6 | 5 | 4 | 3 | 2 | 1 | 0 | |
|---|---|---|---|---|---|---|---|---|
| 0 | TEMP ERROR | RF ERROR | BufferOvfl | COLL ERROR | CRC ERROR | PARITY ERROR | PROTOCOL ERROR | |
| PRELIMINARY | GRANTED | GRANTED | GRANTED | GRANTED | GRANTED | GRANTED | GRANTED | ACCESS PRIVILEGE |

WIRELESS COMMUNICATION APPARATUS AND RESPONSE DATA PROCESSING METHOD THEREFOR

CROSS REFERENCE TO RELATED APPLICATIONS

The present application claims priority to Japanese Patent Document No. P2003-389191 filed on Nov. 19, 2003, the disclosure of which in its entirety is herein incorporated by reference.

BACKGROUND OF THE INVENTION

The present invention relates to wireless communication apparatuses. More specifically the present invention relates to a wireless communication apparatus incorporating near field communication (NFC) technology.

In a known non-physical-contact communication technology, a compact and lightweight terminal device, such as a mobile phone, incorporates a non-contact IC (integrated circuit) card and communicates with, for example, an IC card reader/writer. See, Japanese Unexamined Patent Application Publication No. 2002-345037. In that publication, a mobile phone incorporates a non-contact IC card and the card of the mobile phone is brought into close proximity to an IC card R/W (IC card reader/writer), thus allowing the information stored in the non-contact IC card to be communicated over electromagnetic waves from the IC card reader/writer.

One short-range wireless communication technology extended to inter-device communication using a communication protocol between non-contact IC cards and IC card readers/writers, called near field communication (NFC) technology, has attracted attention. The NFC technology (an NFC antenna, an NFC circuit, a SAM (secure application module) card, etc.) incorporated in devices such as mobile phones, digital cameras, PDAs (personal digital assistants), notebook PCs (personal computers), game devices, and computer peripheral devices enables any type of data to be exchanged with other NFC-incorporated devices in a short range less than, for example, 20 cm.

Due to its shorter communication range than wireless communication systems, such as Bluetooth and wireless LAN systems, the NFC system provides high security communication. The NFC technology has also attracted attention in view of a different feature from traditional communication technologies, namely, that the NFC technology enables automatic communication between NFC-incorporated devices within or near a predetermined region. The NFC technology also enables data communication at high transfer rates (e.g., up to 424 kbps), at which high-quality images can be transmitted.

A portable wireless communication terminal, such as a mobile phone or a PDA, including a wireless communication interface device incorporating NFC technology enables credit card settlement and access to network content, such as tickets and games, in a simple manner once the NFC-incorporated device is brought into close proximity. The NFC technology is also expected, by content and service providers, to provide a new mechanism for users to access various services.

A wireless communication control device (e.g., a wireless communication interface device) is typically controlled by a controller (e.g., a baseband controller) during communication between a card of a portable communication device and an IC card reader/writer. When wirelessly transmitting or receiving frames, the controller must read and write the information stored in a register of the wireless communication interface device at a high rate. If the controller cannot access the register of the wireless communication interface device at high rate, communication is not established.

A response check, such as polling, required for detecting a communicating party within a communication range is particularly time-critical because response data, such as polling responses, must be transmitted and received in a limited short period of time.

Thus, a high-performance controller is required for performing response checking and other normal processing. However, due to the demands for saving the energy to prolong the operating time and reducing the size of devices, such as mobile phones, it is difficult to incorporate a high-performance controller into the devices.

SUMMARY OF THE INVENTION

The present invention relates to wireless communication apparatuses. More specifically the present invention relates to a wireless communication apparatus incorporating near field communication (NFC) technology.

In an embodiment, a wireless communication apparatus and response data processing method therefor are provided in which response data processing, such as response checking, can be performed individually without control from a controller.

In an embodiment of the present invention, a wireless communication apparatus that communicates data with an external wireless apparatus in a wireless communication range includes a controller configured to control the wireless communication apparatus, and a wireless communication interface device configured to receive response data independently from control of the controller in response to response request data transmitted to the external wireless apparatus. The wireless communication interface device includes a transmitter configured to transmit the response request data, a counter configured to count time for determining whether or not a time limit for waiting for the response data has elapsed, a storage unit configured to store the response data, a receiver configured to receive first response data from the external wireless apparatus and instantaneously receive second response data without an instruction from the controller when the time limit has not elapsed, a frame length checking unit configured to check a frame length of the received response data, and an error detector configured to perform error detection on the response data. An error detection result of the error detector is stored in the storage unit.

According to an embodiment, the wireless communication interface device performs time-critical response data processing independently without using the processing performance of the controller. Thus, a high-performance controller is not required for performing the response data processing since the processing resource of the controller can effectively be utilized. The external wireless apparatus may be any apparatus capable of transmitting and receiving data to and from the wireless communication apparatus, or may be a wireless communication apparatus.

The frame length checking unit may check a frame value set in the response data against a preset frame value, the frame value indicating the frame length of the response data. The frame value may be set in a length portion of the response data.

The controller and the wireless communication interface device may be connected by a serial interface. The serial interface requires a fewer signal lines than a parallel interface, thus providing a larger space for installation and high layout flexibility. Since the space is saved, the size can be reduced.

The storage unit may have a capacity such that a plurality of response data or response request data can be stored. Therefore, the rate at which the controller accesses the response data or response request data stored in the storage unit in the wireless communication interface need not be high.

The error detector may remove an error detection code included in the response data, and the response data from which the error detection code is removed may be stored in the storage unit. Therefore, an error detection result can be immediately checked for without performing error detection each time response data is accessed, and efficient data storage can be achieved.

The wireless communication interface device may further include a state machine unit that controls the processing performed independently from the controller, and the receiver may receive the second response data according to an instruction from the state machine unit. Therefore, the transmitter, the counter, the storage unit, the receiver, the frame length checking unit, and the error detector of the wireless communication interface device can perform the individual processing according to instructions from the state machine unit using commands without control of the controller. The commands are issued by the controller to the wireless communication interface device, and are then processed by the wireless communication interface device using the state machine unit.

In another embodiment, a wireless communication apparatus that communicates data with an external wireless apparatus in a wireless communication range includes a controller configured to control the wireless communication apparatus, and a wireless communication interface device configured to transmit response data independently from control of the controller in response to response request data received from the external wireless apparatus. The wireless communication interface device includes a receiver configured to receive the response request data, a storage unit configured to store the response data, an identification information authenticating unit configured to authenticate identification information that is included in the received response request data, an identification information setting unit configured to set identification information of the wireless communication apparatus in the response data when the response request data includes request information that requests identification information, a time frame determining unit configured to determine a time frame in which the response data is to be transmitted, and a transmitter configured to transmit the response data according to the time frame without an instruction from the controller.

According to another embodiment, the wireless communication interface device performs time-critical response data processing independently without using the processing performance of the controller. Thus, a high-performance controller is not required for performing the response data processing since the processing resource of the controller can effectively be utilized. In an embodiment, the external wireless apparatus may be any apparatus capable of transmitting and receiving data to and from the wireless communication apparatus, or may be a wireless communication apparatus.

The identification information authenticating unit may compare the identification information included in the response request data with identification information of the wireless communication apparatus that receives the response request data.

The controller and the wireless communication interface device may be connected by a serial interface.

The wireless communication interface device may further include a state machine unit that controls the processing performed independently from the controller. Therefore, the receiver, the storage unit, the identification information authenticating unit, the identification information setting unit, the time frame determining unit, and the transmitter of the wireless communication interface apparatus can perform the individual processing according to instructions from the state machine unit using commands without control of the controller.

In still another embodiment, a response data processing method for a wireless communication apparatus including a controller, for communicating data with an external wireless apparatus in a wireless communication range by requesting response data and waiting for the response data from the external wireless apparatus includes the steps of counting a time limit for waiting for the response data from the external wireless apparatus without control of the controller, checking a frame length of the response data without control of the controller, performing error detection on the response data without control of the controller, and storing the response data and an error detection result without control of the controller.

In the step of checking a frame length, a frame value set in the response data may be checked against a preset frame value, the frame value indicating the frame length of the response data.

The stored response data may be response data from which an error detection code used in the error detection is removed.

In still yet another embodiment, a response data processing method for a wireless communication apparatus including a controller, for communicating data with an external wireless apparatus in a wireless communication range by receiving response request data from the external wireless apparatus and transmitting response data in response to the response request data, includes the steps of authenticating identification information that is included in the received response request data without control from the controller, setting identification information of the wireless communication apparatus in the response data without control of the controller when the response request data includes request information that requests identification information, determining a time frame in which the response data is to be transmitted without control from the controller, and transmitting the response data according to the time frame.

In the step of authenticating identification information, the identification information included in the response request data may be compared with identification information of the wireless communication apparatus that receives the response request data.

According to an embodiment, therefore, time-critical response data processing can be performed independently without control of a controller.

The present invention is applicable to a wireless communication apparatus capable of wireless communication, particularly, to a wireless communication apparatus incorporating NFC technology.

Additional features and advantages of the present invention are described in, and will be apparent from, the following Detailed Description of the Invention and the figures.

BRIEF DESCRIPTION OF THE FIGURES

FIG. 7 is a schematic diagram of the frame format of a polling response in an embodiment.

FIG. 8 is a schematic diagram of an error register according to an embodiment.

DETAILED DESCRIPTION OF THE INVENTION

Preferred embodiments of the present invention will be described in detail with reference to the accompanying drawings. In the following description taken in conjunction with the drawings, components having substantially the same function and structure are given the same reference number, and an overlapping description thereof is omitted.

Figure 1:
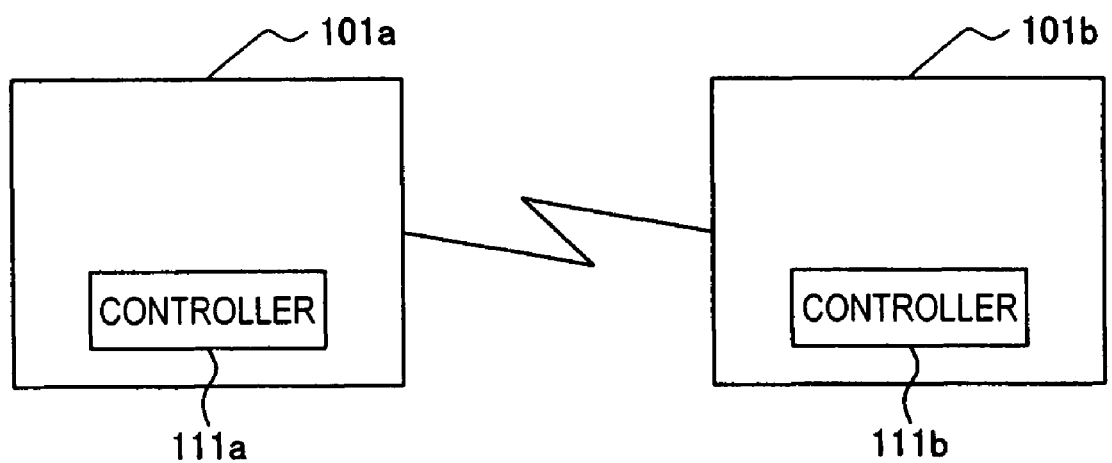
FIG. 1 is a schematic diagram of a wireless communication system including a wireless communication apparatus according to an embodiment of the present invention.

A wireless communication apparatus according to an embodiment of the present invention will be described with reference to FIG. 1. FIG. 1 is a schematic diagram of a wireless communication system 100 including the wireless communication apparatus of this embodiment.

The wireless communication system 100 includes a plurality of wireless communication apparatuses 101 (101a and 101b). Although two wireless communication apparatuses 101 are shown in FIG. 1, any number of communication apparatuses more than one may be used.

Throughout this document, in the wireless communication system 100, the wireless communication apparatus 101 that issues a polling command is referred to as an initiator, and the wireless communication apparatus 101 that receives a polling command from the initiator and that issues and transmits a polling response to the initiator is referred to as a target. In this embodiment, the polling command may be, but is not limited to, one type of response request data for requesting response data.

In FIG. 1, for example, the wireless communication apparatus 101a is an initiator and the wireless communication apparatus 101b is a target. In wireless communication in the wireless communication system 100 of this embodiment, when the target is near a communication region less than, for example, 20 cm from the initiator, the target is allowed to receive a polling command issued by the initiator at predetermined time intervals. Upon receiving a polling response issued from the target within a time limit, the initiator identifies the target (the wireless communication apparatus 101b), and communicates with the target. Polling is described in detail below.

The wireless communication apparatus 101 may be a communication apparatus using the NFC technology. The wireless communication apparatus 101 may be a battery-equipped apparatus, such as a mobile phone, a digital camera, a notebook PC, an IC card reader/writer, or a PDA, or a non-battery apparatus, such as a non-contact IC card.

The wireless communication apparatus 101 in the wireless communication system 100 includes a control circuit having a controller 111 for controlling the wireless communication device 101, and a wireless communication interface device incorporating NFC functions.

In an embodiment, the controller 111 (including controllers 111a and 111b) is a control unit that controls the overall apparatus, and the control unit may be, but is not limited to, for example, a baseband controller of a mobile phone, a central processing unit (CPU) of a notebook PC, or a microprocessor.

Figure 2:
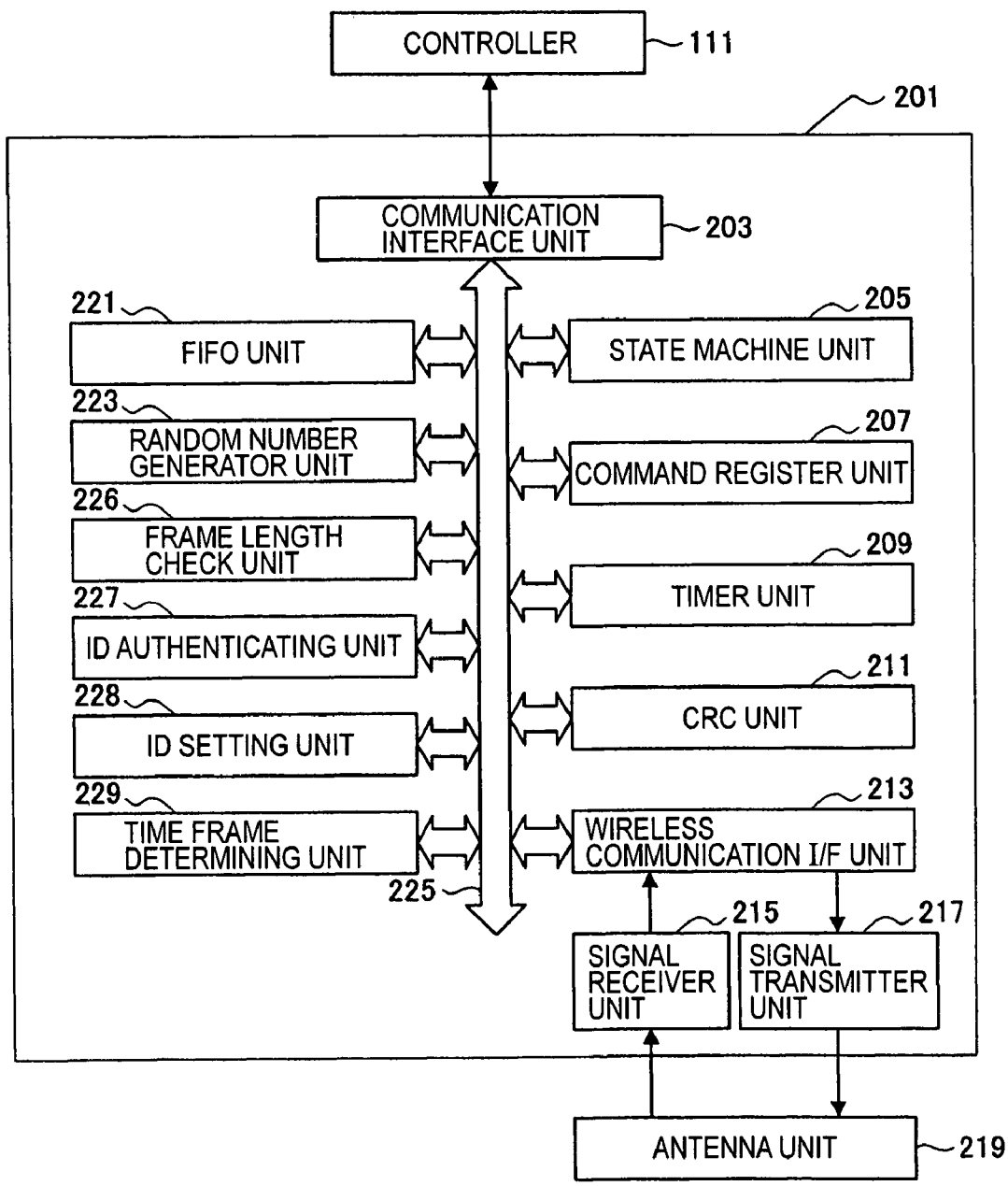
FIG. 2 is a schematic block diagram of the wireless communication apparatus in an embodiment.

The circuit structure of the wireless communication apparatus 101 incorporating NFC functions according to this embodiment will be described with reference to FIG. 2. FIG. 2 is a schematic block diagram of the wireless communication apparatus 101 according to this embodiment.

As shown in FIG. 2, the wireless communication apparatus 101 includes at least the controller 111, a wireless communication interface device 201, and an antenna unit 219.

The wireless communication interface device 201 issues a polling command at predetermined time intervals and transmits the polling command in form of 13.56-MHz AM-modulated RF signals via the antenna unit 219, or receives a polling response and stores the polling response data demodulated from the RF signal.

The wireless communication interface device 201 includes a communication interface unit 203, a state machine unit 205, a command register unit 207, a timer unit 209, a CRC (cyclic redundancy check) unit 211, a wireless communication I/F (interface) unit 213, a signal receiver unit 215, a signal transmitter unit 217, the antenna unit 219, an FIFO (First-In First-Out) unit 221, a random number generator unit 223, a bus 225, a frame length check unit 226, an identification information (ID) authenticating unit 227, an identification information (ID) setting unit 228, and a time frame determining unit 229. The wireless communication interface device 201 receives or transmits a polling command or the like in units of frames, by way of example; however, the present invention is not limited to this example.

The communication interface unit 203 is connected with the controller 111 via a serial interface. For example, 8-bit parallel or serial data is transmitted to the communication interface unit 203.

The serial interface that connects the communication interface unit 203 and the controller 111 may be, for example, an SPI (Serial Peripheral Interface), a UART (Universal Asynchronous Receiver Transmitter) serial interface, or a 12C serial interface.

As shown in FIG. 2, for example, the antenna unit 219 receives a 13.56-MHz RF (radio frequency) signal transmitted from the target, or transmits a 13.56-MHz RF signal to the target.

The signal receiver unit 215, which is capable of receiving data, such as polling data, removes the fundamental component from the 13.56-MHz AM-modulated RF signal, and then demodulates the RF signal. The demodulated data is digital data indicating a "0" or "1" signal. The signal transmitter unit 217 modulates the data transmitted from the wireless communication I/F unit 213 into an RF signal, and transmits the RF signal to the antenna unit 219.

Upon receiving a first polling command or a first polling response, the signal receiver unit 215 and the wireless communication I/F unit 213 immediately receive a second polling command or a second polling response according to an instruction not from the controller 111 but from the state machine unit 205.

The CRC unit 211 is an error detection unit that receives the data transmitted in units of frames and that sequentially performs a cyclic redundancy check (CRC) on the received data for error detection. After the error detection, the CRC unit 211 stores the data and an error detection result in the FIFO unit 221. A CRC is a procedure used to check for errors in data transmission or when reading from and writing to a disk. Any other procedure may be used, such as an odd parity check, an even parity check, a vertical redundancy check (VRC), a longitudinal redundancy check (LRC), a group check, or a checksum. The details of the CRC processing are described below.

The timer unit 209 generates a timing signal using a counter, and counts time using a clock signal so that the processing of the wireless communication interface device 201 is performed at a desired time or within a certain period of time. The clock signal counted by the timer unit 209 is checked to perform the processing at a desired time.

The timer unit 209 may be a monitor timer that indicates an alarm at timeout, a watchdog timer that alerts the operator that processing is impossible, a real-time timer, a periodic timer or the like.

The command register unit 207 is a register incorporated in the wireless communication interface device 201. The command register unit 207 stores start or end commands for the processing to be executed by the state machine unit 205.

The command register unit 207 stores commands, e.g., "Idle", "Config", "GenerateRandomID", "CalcCRC", "Transmit", "Receive", "Transceive", "AutoColl", "MFAuthent", "SoftReset", and the like.

The "Idle" command is a command for canceling execution of the current command. The "Config" command is a command for setting the communication environment, e.g., a certain time or time intervals at which a polling command is issued. The "GenerateRandomID" command is a command for generating a 10-byte random number. The "CalcCRC" command is a command for causing the CRC unit 211 to perform a CRC.

The "Transmit" command is a command for transmitting data to the FIFO unit 221. The "Receive" command is a command for causing the receiver to wait for data to be transmitted.

If a control register (not shown) is set to "1", the "Transceive" command causes the initiator to transmit data from the FIFO unit 221 via the antenna unit 219, and causes the initiator to function as a receiver automatically after the transmission. If the control register is set to "0", the "Transceive" command causes the initiator to function as a transmitter automatically when data is received via the antenna unit 219.

The "AutoColl" command is a command for handling polling. A command for the subsequent processing to polling is stored in the FIFO unit 221. The "SoftReset" command is a command for initializing the wireless communication interface device 201.

The state machine unit 205 executes the commands stored in the command register unit 207, and instructs the processing. The state machine unit 205 is implemented by a logic circuit. For example, after the state machine unit 205 executes a command and instructs the processing, if an error occurs in the instructed component, then, the state machine unit 205 executes a command stored at a predetermined address of the command register unit 207. Thus, the state machine unit 205 executes or terminates the commands stored in the command register unit 207 according to conditions.

By executing the commands, the state machine unit 205 can control multiple processes, such as polling, independently from control of the controller 111 in the wireless communication device 101. In an embodiment, the state machine unit 205 is implemented by a logic circuit. Alternatively, the state machine unit 205 may be implemented by a program, e.g., firmware. The command that triggers polling is issued by the controller 111 or the like.

The FIFO unit 221 is a data storage unit, and is a register in and from which data is stored and retrieved in FIFO order. In this embodiment, the capacity of the FIFO unit 221 may be, but is not limited to, 64 bytes.

The random number generator unit 223 generates a 10-byte random number in response to the "GenerateRandomID" command. This random number is used for polling in this embodiment, namely, for determining a time slot.

The frame length check unit 226 checks for the frame length of the received data based on a prescribed frame length according to an instruction from the state machine unit 205. For example, the frame length check unit 226 compares a value set in a length portion of a polling command, indicating the frame length, with a prescribed frame value, and determines whether or not a match is found. This example is merely illustrative, and it may be determined whether or not the frame length is within a prescribed frame value.

The ID authenticating unit 227 authenticates a system code, which is identification information that identifies the wireless communication device 101 at the receiving destination, from the received data according to an instruction from the state machine unit 205. If the correct system code is set, the received data is regarded as correct data, and is not discarded.

When the data transmitted from the wireless communication apparatus 101 at the receiving source has a setting that the system code of the wireless communication apparatus 101 at the receiving destination be sent, the wireless communication apparatus 101 at the receiving destination sets its system code in response data, and transmits the response data to the wireless communication apparatus 101 at the receiving source according to an instruction from the state machine unit 205.

For example, the target receives a polling command from the initiator. When the ID setting unit 228 of the target determines that the polling command has a setting that its system code be sent, this system code is set in polling response data. The process for setting a system code is described below.

The time frame determining unit 229 determines a time slot in which the target is to transmit a polling response to the initiator based on the random number generated by the random number generator unit 223.

Figure 3:
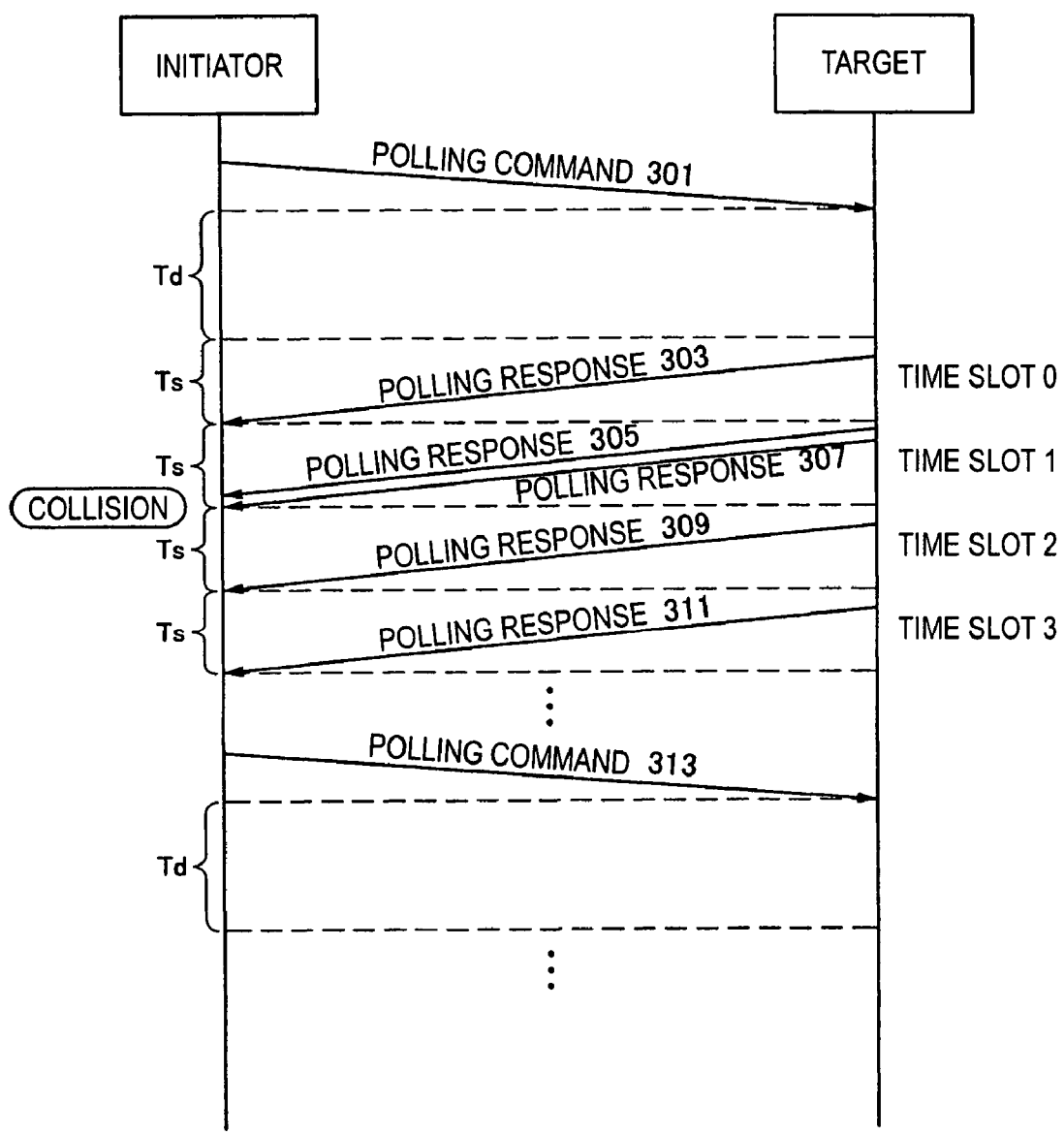
FIG. 3 is a timing chart schematically showing polling processing in an embodiment.

Polling of the wireless communication apparatus 101 according to an embodiment will now be described with reference to FIG. 3. FIG. 3 is a timing chart schematically showing polling processing according to an embodiment.

As shown in FIG. 3, the target within a communication range is ready to receive a polling command from the initiator. Upon receiving a polling command 301, the target determines a time slot for a response to the initiator according to a time slot number (TSN) specified in the frame of the polling command 301. In FIG. 3, five targets are shown; however, any number of targets may be used as long as one or more than one target is used. In this embodiment, a time slot is determined by the random number generated by the random number generator unit 223, as described in detail below.

When the time slot is determined, the target transmits a polling response to the initiator in the allocated time slot after a fixed response time ($T_d$). For example, the target allocated time slot 2 sends a polling response 309 to the initiator after time $T_d$ and $2 \times T_s$ has passed.

When it is determined from counting of the timer unit 209 that a time limit for waiting for a polling response from the target has passed after the initiator sent a polling command, the initiator finishes receiving a polling response from the target. After the predetermined period of time, the series of polling operations is repeated; the initiator again issues and transmits a polling command to the target.

Figure 4:
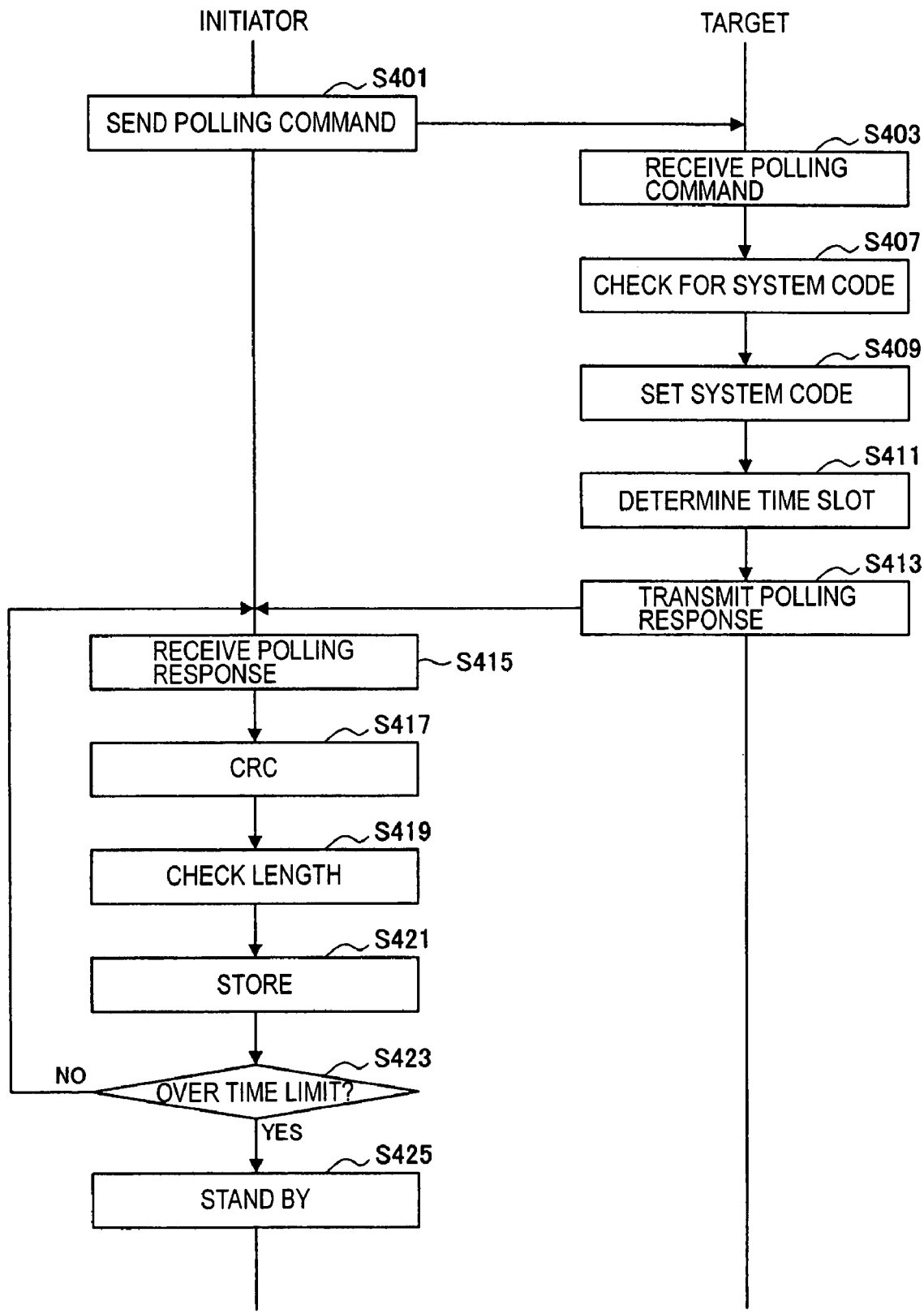
FIG. 4 is a flowchart schematically showing the polling operation in an embodiment.

A polling process of the wireless communication apparatus 101 according to this embodiment will now be described with reference to FIG. 4. FIG. 4 is a flowchart schematically showing the polling operation of this embodiment. In FIG. 4, polling is performed between one initiator and one target, by way of example. This example is merely illustrative, and polling may be performed between one initiator and N targets or between N initiators and N targets.

As shown in FIG. 4, the initiator issues and transmits a polling command to the target at predetermined time intervals according to the command executed by the state machine unit 205 (step S401). At the time when the polling command is transmitted, the timer unit 209 of the initiator starts counting a time limit for waiting for a polling response to be returned from the target. The time limit is preset as environment setting information by, for example, the "Config" command or the like.

Figure 5:
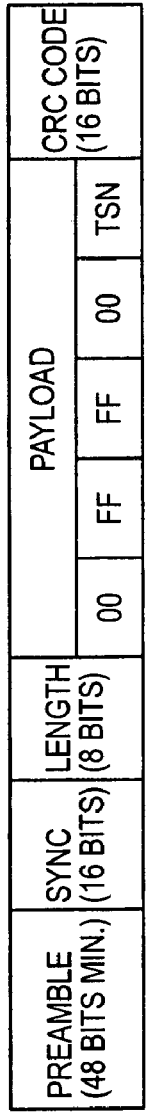
FIG. 5 is a schematic diagram of the frame format of a polling command in an embodiment.

The frame format of the polling command of this embodiment will be described with reference to FIG. 5. FIG. 5 is a schematic diagram of the frame format of the polling command of this embodiment.

As shown in FIG. 5, the frame of the polling command is constituted by a preamble portion containing a minimum of 48 bits, a 16-bit SYNC portion indicating the sync start position, an 8-bit length portion indicating the length (byte) obtained by adding one byte to the payload length (byte), a payload portion, and a 16-bit CRC code portion. The frame format of the polling command complies with, for example, ISO/IEC 18092. The added one byte of the length portion indicates the length of the length portion.

In the polling command of an embodiment, the preamble portion is set to "0", the SYNC portion is set to hexadecimal "B24D", and the length portion is set to "6".

The payload portion has hexadecimal "00", "FF", "FF", and "00" each set in one byte in order from the portion on the right of the length portion shown in FIG. 5, and also has "TSN (time slot number)". The "TSN" is set to a time slot number value, represented by hexadecimal "00", "01", or "0F", and the remaining area is a reserved area (RSN).

For example, if the "TSN" is set to "00", the target determines only time slot 0. For example, when the "TSN" is set to "0F", the target determines any time slot from time slots 0 to F.

Referring back to FIG. 4, the polling command transmitted from the initiator is received by a target within the communication range (step S403). The target that receives (step S403) the polling command stores in advance the frame of a polling response in form of logic levels in order to instantaneously respond to the initiator.

Upon receiving the polling command, according to the command executed by the state machine unit 205, the target checks for the system command by comparing the system code of the target stored in advance together with the frame of the polling response with the system code set in the received polling command (step S407).

The system code set in the polling command is allocated "FFFF" in the payload portion at the second and third bytes from the left. The "FFFF" is a wildcard, which is applied to any system code.

If a match is found between the system code of the received polling command and the system code stored in the target in advance, this target is regarded as an appropriate target that is to return a polling response, and the subsequent processing is performed. If an incorrect system code is set in the polling command, the state machine unit 205 stops polling due to a system code error. For example, when system code "1234" is stored, system code "1243" is regarded to be incorrect.

Then, the target checks for the 1-byte value on the left of the "TSN" of the payload portion of the polling command. If this value is "01", the system code of this target is set in a pad portion of the frame of a polling response (step S409). In FIG. 5, the 1-byte value on the left of the "TSN" is "00".

In this case, as shown in FIG. 5, the target does not set the system code in the pad portion of the polling response. If this 1-byte value is "01", the target having system code "1234" sets "1234" in the pad portion of the polling response.

The initiator that receives the polling response can obtain the system code of the target from the target, and can efficiently identify the target if the initiator does not know the system code of the target when transmitting the polling command. The frame format of the polling response is described in detail below.

Then, the target determines the time slot in which the polling response of this target is sent to the initiator (step S411). The time slot is determined based on the random number generated by the random number generator unit 223.

For example, slot time slot 0 is allocated when the time slot number ("TSN") value of the polling command is "00", time slot 0 or time slot 1 is allocated when the time slot number value is "01", any of time slots 0 to 3 is allocated when the time slot number value is "03", and any of time slots 0 to 7 is allocated when the time slot number value is "07".

Figure 6:
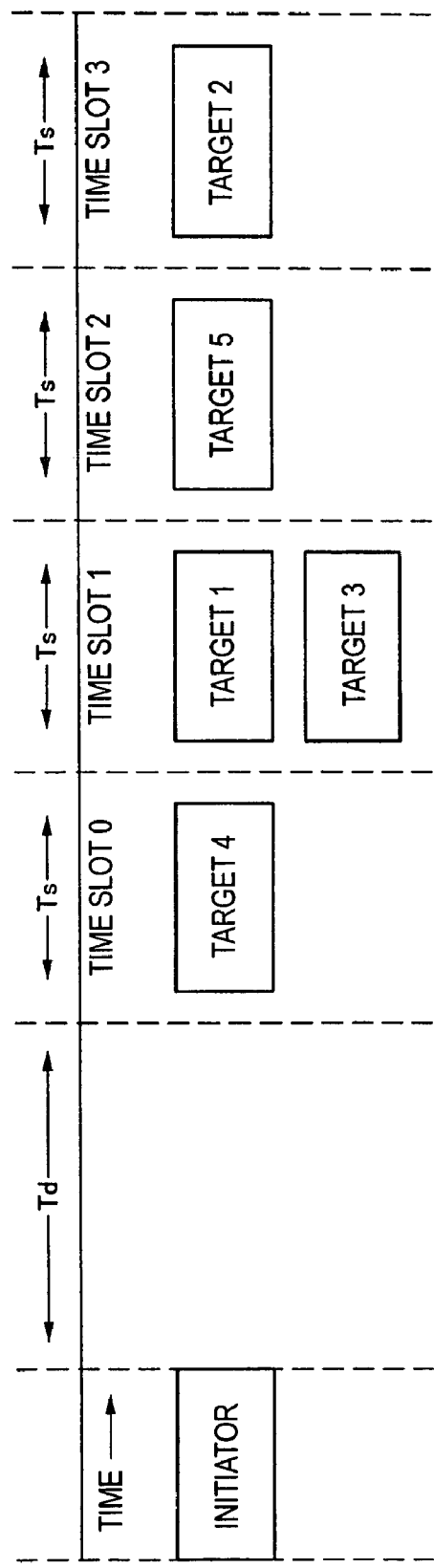
FIG. 6 is a chart showing the relationship between targets and time slots allocated to the targets in an embodiment.

When the time slot is determined (step S411), as shown in FIG. 6, the time at which each target is to transmit a polling response is determined. The targets transmit polling responses to the initiator in the individually allocated time slots (step S413). FIG. 6 is a chart showing the relationship between targets and the time slots allocated to the targets according to this embodiment.

As shown in FIG. 6, targets 1 and 3 are allocated time slot 1. In this case, the random number generator unit 223 of the target 1 and the random number generator unit 223 of the target 3 generate the same random number.

In this event, which is rare, a single time slot is allocated to a plurality of targets, and these targets return polling responses to the initiator in this time slot. At this time, collision occurs, and the initiator does not correctly receive the polling responses.

As shown in FIG. 3, the targets that are allocated time slot 1 transmit polling responses 305 and 307 to the initiator. These polling responses are transmitted substantially at the same time, which causes collision, and are not correctly received by the initiator.

The frame format of the polling response of this embodiment will now be described with reference to FIG. 7. FIG. 7 is a schematic diagram of the frame format of the polling response of this embodiment. The frame format of the polling response complies with, for example, ISO/IEC 18092.

As shown in FIG. 7, the frame format of the polling response is constituted by a preamble portion containing a minimum of 48 bits, a 16-bit SYNC portion indicating the sync start position, a length portion indicating the length from a payload portion to the end (byte), the payload portion, and a 16-bit CRC code portion.

In the polling response of this embodiment, the preamble portion is all set to "0", the SYNC portion is set to hexadecimal "B24D", and the length portion is set to hexadecimal "12".

The payload portion has hexadecimal "01" set in one byte, an 8-byte NFCID2 portion, and an 8-byte pad portion in order from the portion on the right of the length portion shown in FIG. 7 (from the beginning position of the payload portion).

As described above, when "01" is set in the payload portion of the polling command, a 2-byte system code of this target is added to the 8-byte pad portion in the polling response, and the resulting polling response is transmitted.

The CRC code portion of the frame of the polling response has a remainder value given from generator polynomial (G(x)) when transmitting the polling response. Based on the remainder value set in the CRC code portion, the initiator performs a CRC to check for errors in the data.

Referring back to FIG. 4, the polling response having the frame format described above is transmitted from the target in the allocated time slot, and is then received by the initiator within the receiving time limit for the initiator (step S415).

Then, the CRC unit 211 of the initiator receives bit-by-bit the polling response data demodulated from the polling responses transmitted from the target, which is sequentially supplied from the wireless communication I/F unit 213, and performs a CRC (step S415).

The CRC is performed sequentially on every one byte included in the frame of the polling response. The CRC is performed while receiving the polling response from the target rather than after receiving all data included in the frame. The CRC is defined by, for example, ISO/IEC 18092.

The generator polynomial (G(x)) for use in a CRC according to this embodiment is given by Eq. (1) below, complying with ITU-T Recommendation V.41. This generator polynomial is merely illustrative, and, for example, ANSI CRC-16 generator polynomial may be used instead.

$$G(x)=x^{16}+x^{12}+x^{5}+1 \quad \text{Eq. (1)}$$

At a first stage, according to an instruction from the state machine unit 205, the CRC unit 211 of the initiator extracts one byte from the most significant bit (MSB) that is the beginning bit of the frame of the polling response data transmitted from the wireless communication I/F unit 213.

At a second stage, in response to the command executed by the state machine unit 205, the CRC unit 211 performs left bit-shifting to move the CRC value left, and a carry bit is XORed with Eq. (1).

At a third stage, the CRC unit 211 performs left bit-shifting to move the extracted data left, and a carry bit is XORed with the CRC value and the data extracted at the first stage.

At a fourth stage, in response to the command executed by the state machine unit 205, the CRC unit 211 repeats the processing in the second and third stages seven times to process the remaining 7 bits of the 8 bits.

If the data for CRC still remains, at a fifth stage, in response to the command executed by the state machine unit 205, the CRC unit 211 performs the processing in the first to fourth stages again.

After the CRC processing from the first to fifth stages, if the CRC value is "0", it is determined that no error occurs. That is, no remainder exists. If any remainder exists, it is determined that an error occurs.

If the CRC unit 211 detects an error as a result of CRC processing, the state machine unit 205 sets "1" in a CRC error field in an error register of the FIFO unit 221.

The error register of this embodiment will now be described with reference to FIG. 8. FIG. 8 is a schematic diagram of the error register of this embodiment.

As shown in FIG. 8, the error register is constituted by a "preliminary" field at the seventh bit; a "Temp error" field, an "RF error" field, a "BufferOvfl" field, a "Coll error" field, a "CRC error" field, a "Parity error" field, and a "protocol error" field.

The "preliminary" field has "0" stored therein in advance. The "Temp error" field is set to "1" indicating a temp error when a temperature sensor detects heat, and the power of the antenna unit 219 is automatically turned off.

The "RF error" field is set to "1" indicating an RF error when the other party does not operate in an active communication mode in the RF field within a certain period of time, which is specified by the NFCIP1 standard.

The "BufferOvfl" field is set to "1" indicating a buffer overflow when the state machine unit 205 is to write data into the FIFO unit 221 that is full.

The "Coll error" field is set to "1" when bit collision is detected, and is automatically initialized at the initial stage on the target side. The "Coll error" field is set to "1" only when the transmission rate is 106 kbps, and is set to "0" otherwise, e.g., when the transmission rate is 212 kbps or 424 kbps.

The "CRC error" field is set to "1" when the CRC unit 211 detects an error as a result of CRC processing. The value set in the "CRC error" field is automatically initialized when reception begins.

The "Parity error" field is set to "1" when an error is detected as a result of parity check. The value set in the "Parity error" field is automatically initialized when reception begins.

The "Protocol error" field is set to "1" indicating a protocol error at least in any case of: (1) incorrect SOF (start of frame), (2) "1" set in the initiator of the control register when executing an "AntiColl" command, and (3) incorrect data length of received data.

Referring again to FIG. 4, after CRC processing (step S417), the state machine unit 205 determines whether or not the value set in the length portion of the received polling response is within a range preset by the initiator (step S419).

For example, the value set in the length portion of the polling response is 100 bytes, and the range preset by the initiator is 1 to 20 bytes. In this case, the value set in the length portion is out of the range, and therefore, no data is stored in the FIFO unit 221.

The initiator may preset a range or a fixed value, e.g., "17" or "30".

After the value set in the length portion of the polling response is checked for (step S419), the state machine unit 205 stores the data of the polling response, exclusive of the CRC code portion, in the FIFO unit 221 (step S421).

If the predetermined time limit for waiting for the polling response, which is counted by the timer unit 209 of the initiator, has elapsed (step S423), the initiator terminates the series of polling operations, and waits for the next polling command to be transmitted (step S425). After standby, when the predetermined period of time has elapsed, a polling command is transmitted again to the target, and the polling procedure described above (the processing of steps S401 to S423) is repeated.

Therefore, the wireless communication interface device 201 can independently perform time-critical polling even if the controller 111 accesses a register, such as the FIFO unit 221, at a low rate, or without control from the controller 111.

Thus, the controller 111 of the wireless communication apparatus 101 need not have excessive capabilities, resulting in high design flexibility. In the present invention, the controller, which is difficult to mount due to the cost of improvement in the art, can be connected with the wireless communication interface device 201, or a high-performance controller is not required. Thus, the cost can be reduced.

Polling is performed not under the control of the controller 111 but under the control of the wireless communication interface device, resulting in low access rate. Therefore, the controller 111 and the wireless communication interface device 201 can be connected by a low-rate communication interface 203, such as a UART interface.

The UART interface is a serial interface that only requires two lines for transmitting signals and that requires a smaller space than a parallel interface. Thus, the layout of other devices can be flexibly conducted.

A parallel interface requires the parallel signal width (eight lines for 8 bits) for transmitting and receiving signals in a parallel manner, and also requires several timing control lines. Therefore, the parallel signal wiring is not suitable for lightweight and compact mobile devices, such as portable phones.

Time-critical polling can be performed substantially solely by the wireless communication interface device 201, thus minimizing the size of the logic source compared to polling performed by a timer device (not shown), a CPU (not shown), etc., typically incorporated in the controller 111.

While a preferred embodiment of the present invention has been described with reference to the accompanying drawings, the present invention is not limited to this embodiment. It should be appreciated that a variety of modifications or changes may be made without departing from the technical scope of the invention set forth in the appended claims, and these modifications or changes may also be embraced in the scope of the present invention.

In the illustrated embodiment, the state machine unit 205, the CRC unit 211, the timer unit 209, the random number generator unit 223, the frame length check unit 226, the ID authenticating unit 227, the ID setting unit 228, and the time frame determining unit 229 of the wireless communication interface device 201 are implemented by hardware (logic circuits). However, the present invention is not limited to this embodiment. For example, the state machine unit 205, the CRC unit 211, the timer unit 209, and the random number generator unit 223 may be implemented by a program composed of one or more than one module or component.

While the wireless communication apparatus 101 and the wireless communication interface device 201 have been described in the context of wireless communication, the present invention is not limited to wireless communication, and may embrace, for example, communication via a line.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A mobile wireless communication apparatus that communicates data with an external wireless apparatus in a wireless Near Field Communication range, the mobile wireless communication apparatus comprising:
    a baseband controller configured to control communication via a cellular phone network and the mobile wireless communication apparatus; and
    a wireless Near Field Communication interface device configured to transmit a response request data to the external wireless apparatus by wireless Near Field Communication, to receive response data from the external wireless apparatus independently from control of the baseband controller, and to perform response data processing independent from control of the baseband controller, wherein the response request data includes a system code, the system code included in the response request data is compared with a system code stored in the external wireless apparatus, and the response data is received from the external wireless apparatus when the system code included in the response request data matches the system code stored in the external wireless apparatus, the wireless Near Field Communication interface device comprising:
    a transmitting unit configured to transmit the response request data by wireless Near Field Communication;
    a counter unit configured to count time for determining whether or not a time limit for waiting for the response data has elapsed;
    a storage unit configured to store the response data;
    a receiving unit configured to receive first response data from the external wireless apparatus by wireless Near Field Communication and instantaneously receive second response data without an instruction from the baseband controller when the time limit has not elapsed;
    a frame length checking unit configured to check a frame length of the received response data; and
    an error detecting unit configured to perform error detection on the response data, an error detection result of the error detecting unit being stored in the storage unit,
    wherein the response data processing performed independent from control of the baseband controller includes checking the frame length of the response data, performing error detection on the response data, and storing the response data and the error detection result in the storage unit.

2. The mobile wireless communication apparatus according to claim 1, wherein the frame length checking unit checks a frame value set in the response data against a preset frame value, and wherein the frame value indicates the frame length of the response data.

3. The mobile wireless communication apparatus according to claim 1, wherein the baseband controller and the wireless Near Field Communication interface device are connected by a serial interface.

4. The mobile wireless communication apparatus according to claim 1, wherein the error detecting unit removes an error detection code included in the response data, and wherein the response data from which the error detection code is removed is stored in the storage unit.

5. The mobile wireless communication apparatus according to claim 1, wherein the wireless Near Field Communication interface device further comprises a state machine unit that controls the processing performed independently from the baseband controller, and wherein the receiving unit receives the second response data according to an instruction from the state machine unit.

6. The mobile wireless communication apparatus according to claim 1, wherein the mobile wireless communication apparatus is a compact and lightweight terminal device.

7. The mobile wireless communication apparatus according to claim 1, further comprising:
    a command register unit to store a command for execution; and
    a state machine unit for executing the command in the command register unit.

8. A mobile wireless communication apparatus that communicates data with an external wireless apparatus in a wireless Near Field Communication range, the mobile wireless communication apparatus comprising:
    a baseband controller configured to control communication via a cellular phone network and the mobile wireless communication apparatus; and
    a wireless Near Field Communication interface device configured to transmit response data independently from control of the baseband controller in response to a response request data received from the external wireless apparatus by wireless Near Field Communication, and to perform response data processing independent from control of the baseband controller, the wireless Near Field Communication interface device comprising:
- a receiving unit configured to receive the response request data by wireless Near Field Communication;
- a storage unit configured to store the response data;
- a system code authenticating unit configured to compare a system code that is included in the received response request data with a system code stored in the wireless communication apparatus;
- an identification information setting unit configured to set identification information of the mobile wireless communication apparatus in the response data when the response data includes request information that requests identification information;
- a time frame determining unit configured to determine a time frame in which the response data is to be transmitted; and
- a transmitting unit configured to transmit the response data by wireless Near Field Communication according to the time frame without an instruction from the baseband controller when the system code that is included in the received response request data matches the system code stored in the wireless communication apparatus, or when the response request data includes request information that requests identification information,
- wherein the response data processing performed independent from control of the baseband controller includes checking the frame length of the response data, performing error detection on the response data, and storing the response data and the error detection result in the storage unit.

9. The mobile wireless communication apparatus according to claim 8, wherein the baseband controller and the wireless Near Field Communication interface device are connected by a serial interface.

10. The mobile wireless communication apparatus according to claim 8, wherein the wireless New Field Communication interface device further comprises a state machine unit that controls the processing performed independently from the baseband controller.

11. The mobile wireless communication apparatus according to claim 8, wherein the mobile wireless communication apparatus is a compact and lightweight terminal device.

12. The mobile wireless communication apparatus according to claim 8, further comprising:
- a command register unit to store a command for execution; and
- a state machine unit for executing the command in the command register unit.

13. A response data processing method for a mobile wireless communication apparatus including a baseband controller, for communicating data with an external wireless apparatus in a wireless Near Field Communication range by transmitting a request for response data and waiting for the response data from the external wireless apparatus, the response data processing method comprising:
- counting a time limit for waiting for the response data from the external wireless apparatus by wireless Near Field Communication without control of the baseband controller;
- receiving the response data when the request for response data includes a system code that matches a system code stored in the external wireless apparatus without control of the baseband controller;
- checking a frame length of the response data without control of the baseband controller;
- performing error detection on the response data without control of the baseband controller;
- storing the response data and an error detection result without control of the baseband controller.

14. The response data processing method according to claim 13, wherein, a frame value set in the response data is checked against a preset frame value, and wherein the frame value indicates the frame length of the response data.

15. The response data processing method according to claim 13, wherein the stored response data comprises response data from which an error detection code used in the error detection is removed.

16. The response data processing method according to claim 13, wherein the mobile wireless communication apparatus is a compact and lightweight terminal device.

17. The response data processing method according to claim 13, further comprising:
- storing a command in a command register; and
- executing the command in the command register independently of the baseband controller.

18. A response data processing method for a mobile wireless communication apparatus including a baseband controller, for communicating data with an external wireless apparatus in a wireless Near Field Communication range by receiving response request data from the external wireless apparatus and transmitting response data in response to the response request data, the response data processing method comprising:
- authenticating a system code that is included in the received response request data without control from the baseband controller by comparing the system code that is included in the received response request data with a system code stored in the wireless communication apparatus;
- setting identification information of the mobile wireless communication apparatus in response data without control of the baseband controller when the response request data includes request information that requests identification information;
- determining a time frame in which the response data is to be transmitted without control from the baseband controller; and
- transmitting the response data by wireless Near Field Communication according to the time frame when the system code that is included in the received response request data matches the system code stored in the wireless communication apparatus, or when the response request data includes request information that requests identification information.

19. The response data processing method according to claim 18, wherein the mobile wireless communication apparatus is a compact and lightweight terminal device.

20. The response data processing method according to claim 18, further comprising:
- storing a command in a command register; and
- executing the command in the command register independently of the baseband controller.

21. A mobile wireless communication apparatus that communicates data with an external wireless apparatus in a wireless Near Field Communication range, the mobile wireless communication apparatus comprising:
- means for controlling communication via a cellular phone network and the mobile wireless communication apparatus; and
- a wireless Near Field Communication interface device configured to transmit a response request data to the external wireless apparatus by wireless Near Field Communication, to receive response data from the external wireless apparatus independently from control of the baseband controller, and to perform response data processing independent from control of the baseband controller, wherein the response data is received from the external wireless apparatus when a system code included in the response request data matches a system code stored in the external wireless apparatus, the wireless Near Field Communication interface device comprising:

means for transmitting the response request data by wireless Near Field Communication;

means for counting time for determining whether or not a time limit for waiting for the response data has elapsed;

means for storing the response data;

means for receiving first response data from the external wireless apparatus by wireless Near Field Communication and instantaneously receiving second response data without an instruction from the baseband controller when the time limit has not elapsed;

means for checking a frame length of the received response data; and means for performing error detection on the response data, wherein an error detection result of the error detecting means is stored in the storage units, wherein the response data processing performed independent from control of the baseband controller includes checking the frame length of the response data, performing error detection on the response data, and storing the response data and the error detection result in the storage unit.

22. The mobile wireless communication apparatus according to claim 21, wherein the mobile wireless communication apparatus is a compact and lightweight terminal device.

23. The mobile wireless communication apparatus according to claim 21, further comprising:

means for storing a command; and means for executing the command independently of the controller.

24. A mobile wireless communication apparatus that communicates data with an external wireless apparatus in a wireless Near Field Communication range, the mobile wireless communication apparatus comprising:

means for controlling communication via a cellular phone network and the mobile wireless communication apparatus; and a wireless Near Field Communication interface device configured to transmit response data independently from control of the baseband controller in response to a response request data received from the external wireless apparatus, and to perform response data processing independent from control of the baseband controller, the wireless Near Field Communication interface device comprising:

means for receiving the response request data by wireless Near Field Communication;

means for storing the response request data;

means for comparing identification information that is included in the received response request data with a system code stored in the wireless communication apparatus;

means for setting identification information of the mobile wireless communication apparatus in the response data when the response request data includes request information that requests identification information;

means for determining a time frame in which the response data is to be transmitted; and means for transmitting the response data by wireless Near Field Communication according to the time frame without an instruction from the baseband controller when the system code that is included in the received response request data matches the system code stored in the wireless communication apparatus, or when the response request data includes request information that requests identification information, wherein the response data processing performed independent from control of the baseband controller includes checking the frame length of the response data, performing error detection on the response data, and storing the response data and the error detection result in the storage unit.

25. The mobile wireless communication apparatus according to claim 24, wherein the mobile wireless communication apparatus is a compact and lightweight terminal device.

26. The mobile wireless communication apparatus according to claim 24, further comprising:

means for storing a command; and means for executing the command independently of the controller.

* * * * *